US012759074B2

(12) United States Patent
Vila I Ferrer et al.

(10) Patent No.: US 12,759,074 B2
(45) Date of Patent: Oct. 13, 2026

(54) METHODS FOR JOINING TWO BLANKS AND BLANKS AND PRODUCTS OBTAINED

(71) Applicant: AUTOTECH ENGINEERING S.L., Amorebieta-Etxano (ES)

(72) Inventors: Elisenda Vila I Ferrer, Sant Quirze del Valles (ES); Pedro Rubio, Sant Adria de Besos (ES); Mireia Illana Gregori, Barcelona (ES); Antoine Riquelme, Santa Oliva (ES)

(73) Assignee: AUTOTECH ENGINEERING S.L., Amorebieta-Etxano (ES)

( * ) Notice: Subject to any disclaimer, the term of this patent is extended or adjusted under 35 U.S.C. 154(b) by 0 days.

(21) Appl. No.: 18/201,646

(22) Filed: May 24, 2023

(65) Prior Publication Data

US 2023/0294202 A1 Sep. 21, 2023

Related U.S. Application Data

(63) Continuation of application No. 16/748,235, filed on Jan. 21, 2020, now abandoned, which is a
(Continued)

(30) Foreign Application Priority Data

Dec. 18, 2015 (EP) .................................... 15382641

(51) Int. Cl.
*B23K 26/06* (2014.01)
*B23K 26/00* (2014.01)
(Continued)

(52) U.S. Cl.
CPC ...... *B23K 26/0608* (2013.01); *B23K 26/0676* (2013.01); *B23K 26/211* (2015.10);
(Continued)

(58) Field of Classification Search
CPC .............. B23K 26/0608; B23K 26/211; B23K 26/0676
(Continued)

(56) References Cited

U.S. PATENT DOCUMENTS 3,865,639 A 2/1975 Bellot et al.
4,546,230 A 10/1985 Sasaki et al.
(Continued)

FOREIGN PATENT DOCUMENTS

CN 101362256 A 2/2009
CN 102015193 A 4/2011
(Continued)

OTHER PUBLICATIONS

Machine Translation of WO9407642A1 (Year: 2025).*
(Continued)

*Primary Examiner* — Edward F Landrum
*Assistant Examiner* — Thomas J Ward
(74) *Attorney, Agent, or Firm* — Squire Patton Boggs (US) LLP

(57) ABSTRACT

Methods for joining a first blank and a second blank, at least one of the first and second blanks comprising at least a layer of aluminum or of an aluminum alloy or a layer of zinc or of a zinc alloy. The method comprises selecting a first portion of the first blank to be joined to the second blank, and selecting a second portion of the second blank to be joined to the first portion, and welding the first portion to the second portion. The welding comprises using a filler metal laser beam and a welding laser beam, and displacing both laser beams in a welding direction to melt and mix a filler wire material with the melted portions of the two blanks. The present disclosure further relates to blanks obtained by any of these methods and to products obtained from such blanks.

17 Claims, 9 Drawing Sheets

Related U.S. Application Data continuation of application No. 15/954,329, filed on Apr. 16, 2018, now abandoned, which is a continuation of application No. PCT/EP2016/081493, filed on Dec. 16, 2016.

(51) Int. Cl.

| | |
|---|---|
| ***B23K 26/067*** | (2006.01) |
| ***B23K 26/211*** | (2014.01) |
| ***B23K 26/26*** | (2014.01) |
| ***B23K 35/02*** | (2006.01) |
| ***B23K 35/28*** | (2006.01) |
| ***B23K 101/18*** | (2006.01) |
| ***B23K 101/34*** | (2006.01) |
| ***B23K 103/04*** | (2006.01) |
| ***B23K 103/08*** | (2006.01) |
| ***B23K 103/10*** | (2006.01) |
| ***C21D 6/00*** | (2006.01) |
| ***C22C 38/02*** | (2006.01) |
| ***C22C 38/04*** | (2006.01) |
| ***C22C 38/44*** | (2006.01) |
| ***C22C 38/48*** | (2006.01) |

(52) U.S. Cl.

CPC .......... *B23K 26/26* (2013.01); *B23K 35/0238* (2013.01); *B23K 35/0261* (2013.01); *B23K 35/282* (2013.01); *B23K 35/286* (2013.01); *C21D 6/004* (2013.01); *C22C 38/02* (2013.01); *C22C 38/04* (2013.01); *C22C 38/44* (2013.01); *C22C 38/48* (2013.01); *B23K 26/0093* (2013.01); *B23K 2101/185* (2018.08); *B23K 2101/34* (2018.08); *B23K 2103/04* (2018.08); *B23K 2103/08* (2018.08); *B23K 2103/10* (2018.08); *C21D 2211/008* (2013.01)

(58) Field of Classification Search

USPC ..................... 228/262.41; 420/442, 452, 453

See application file for complete search history.

(56) References Cited

U.S. PATENT DOCUMENTS

| | | | | |
|---|---|---|---|---|
| 5,283,415 | A | 2/1994 | Nishi et al. | |
| 5,304,777 | A | 4/1994 | Pons et al. | |
| 5,510,597 | A * | 4/1996 | Kampmann | B23K 33/00 219/121.64 |
| 5,591,360 | A | 1/1997 | Mombo-Caristan | |
| 5,724,712 | A | 3/1998 | Bishop | |
| 5,828,032 | A | 10/1998 | Krzys et al. | |
| 6,114,656 | A | 9/2000 | Fairchild | |
| 6,589,671 | B1 | 7/2003 | Kehrer | |
| 6,770,840 | B2 | 8/2004 | Minamida et al. | |
| 7,562,807 | B2 * | 7/2009 | Coleman | C22C 19/057 420/452 |
| 7,863,538 | B2 | 1/2011 | Barhorst et al. | |
| 8,471,173 | B2 | 6/2013 | Miessbacher et al. | |
| 8,499,462 | B2 | 8/2013 | Masek et al. | |
| 8,555,507 | B2 | 10/2013 | Lee et al. | |
| 8,604,382 | B2 | 12/2013 | Yano et al. | |
| 8,748,778 | B2 | 6/2014 | Kodama et al. | |
| 8,758,901 | B2 | 6/2014 | Nakamura et al. | |
| 9,085,041 | B2 | 7/2015 | Peters et al. | |
| 9,186,754 | B2 | 11/2015 | Matsumoto et al. | |
| 9,205,512 | B2 | 12/2015 | Gu et al. | |
| 9,321,132 | B2 | 4/2016 | Briand et al. | |
| 9,381,720 | B2 | 7/2016 | Kwon et al. | |
| 9,457,416 | B2 | 10/2016 | Suzuki et al. | |
| 9,597,988 | B2 | 3/2017 | Sakkinen et al. | |
| 9,604,311 | B2 | 3/2017 | Evangelista et al. | |
| 9,616,527 | B2 | 4/2017 | Briand et al. | |
| 9,623,515 | B2 | 4/2017 | Breuer et al. | |
| 9,682,446 | B2 | 6/2017 | Katoh et al. | |
| 9,833,863 | B2 | 12/2017 | Flugge et al. | |
| 2002/0017509 | A1 | 2/2002 | Ishide et al. | |
| 2003/0121895 | A1 | 7/2003 | Sonoda et al. | |
| 2004/0069831 | A1 * | 4/2004 | O'Donnell | B23K 31/125 228/104 |
| 2005/0028897 | A1 | 2/2005 | Kurz et al. | |
| 2006/0165552 | A1 | 7/2006 | Kapoor et al. | |
| 2008/0011720 | A1 | 1/2008 | Briand et al. | |
| 2008/0128053 | A1 | 6/2008 | Jansen et al. | |
| 2008/0257870 | A1 | 10/2008 | Longfield et al. | |
| 2008/0302450 | A1 | 12/2008 | Kaplan | |
| 2010/0078412 | A1 | 4/2010 | Diez et al. | |
| 2011/0120977 | A1 | 5/2011 | Lai et al. | |
| 2012/0261389 | A1 | 10/2012 | Lin et al. | |
| 2013/0043219 | A1 | 2/2013 | Peters et al. | |
| 2013/0078031 | A1 | 3/2013 | Nakamura et al. | |
| 2013/0098878 | A1 | 4/2013 | Briand et al. | |
| 2013/0112663 | A1 | 5/2013 | Bertin et al. | |
| 2013/0122325 | A1 * | 5/2013 | Park | C21D 5/00 148/543 |
| 2013/0236239 | A1 | 9/2013 | Brandt et al. | |
| 2013/0270233 | A1 | 10/2013 | Gu et al. | |
| 2013/0309000 | A1 * | 11/2013 | Lin | B23K 26/0652 219/121.64 |
| 2014/0003860 | A1 | 1/2014 | Evangelista et al. | |
| 2014/0008334 | A1 * | 1/2014 | Ash | B23K 9/04 219/121.64 |
| 2014/0027414 | A1 | 1/2014 | Lin et al. | |
| 2014/0131338 | A1 | 5/2014 | Postle | |
| 2014/0231395 | A1 | 8/2014 | Brandt et al. | |
| 2015/0306702 | A1 | 10/2015 | Breuer et al. | |
| 2016/0010174 | A1 | 1/2016 | Canourgues et al. | |
| 2017/0080523 | A1 | 3/2017 | Andersson et al. | |
| 2017/0173734 | A1 | 6/2017 | Evangelista et al. | |
| 2017/0304952 | A1 | 10/2017 | Cretteur et al. | |

FOREIGN PATENT DOCUMENTS

| | | | | |
|---|---|---|---|---|
| CN | 102162574 | A | 8/2011 | |
| CN | 102728960 | A | 10/2012 | |
| CN | 102985216 | A | 3/2013 | |
| CN | 103252589 | A | 8/2013 | |
| DE | 10214949 | C1 | 11/2003 | |
| DE | 69627802 | T2 | 4/2004 | |
| DE | 102006011064 | A1 | 9/2007 | |
| DE | 102007059261 | A1 | 6/2009 | |
| DE | 202007018832 | U1 | 10/2009 | |
| DE | 102013101953 | A1 | 8/2014 | |
| EP | 1179382 | A2 | 2/2002 | |
| EP | 1880791 | A1 | 1/2008 | |
| EP | 2511041 | A1 | 10/2012 | |
| EP | 2567776 | A1 | 3/2013 | |
| EP | 2666579 | A1 | 11/2013 | |
| EP | 2735620 | A1 | 5/2014 | |
| EP | 2832887 | A1 | 2/2015 | |
| EP | 2883646 | A1 * | 6/2015 | B23K 1/0056 |
| EP | 2942143 | A1 | 11/2015 | |
| JP | H03110097 | A | 5/1991 | |
| JP | H06328280 | A | 11/1994 | |
| JP | H07132389 | A | 5/1995 | |
| JP | H09285889 | A | 11/1997 | |
| JP | H11147191 | A | 6/1999 | |
| JP | 2000-117470 | A | 4/2000 | |
| JP | 2010-167435 | A | 8/2010 | |
| JP | 2010-167436 | | 8/2010 | |
| JP | 5248347 | B2 | 7/2013 | |
| JP | 2013-533807 | A | 8/2013 | |
| KR | 10-2011-0020847 | A | 3/2011 | |
| KR | 2013-0124472 | A | 11/2013 | |
| KR | 2015-0037984 | A | 4/2015 | |
| WO | WO-9407642 | A1 * | 4/1994 | B23K 35/002 |
| WO | WO 2012/007664 | A1 | 1/2012 | |
| WO | WO 2011/037272 | A1 | 2/2013 | |
| WO | WO 2013/045497 | A1 | 4/2013 | |
| WO | WO 2015/086781 | A1 | 6/2015 | |

(56) References Cited

OTHER PUBLICATIONS

A. Trautmann. Bifocal Hybrid Laser Welding: A Technology for Welding of Aluminium and Zinc-Coated Steels. Forschungsberichte IWB. Band 230. Herbert Utz Verlag. 2009. Munchen. ISBN 978-3-8316-0876-8. Abgerufen und abrufbar unter: https://www.iwb.mw.tu m.degi lead min/w00bwm/www/Institut/Dissertationen/ 230_ Trautmann.pdf.
Artikel "ArcelorMittal Usibor® 1500 Ultra high strength steel, Hot Rolled" von www.matweb.com in der Fassung vom Sep. 26, 2015.
Chinese Patent Application No. 2015800240031, Translation of First Examination Report dated Apr. 27, 2018, 3 pages.
Chinese Patent Application No. 2015800240031, Translation of Second Examination Report dated Dec. 14, 2018, 3 pages.
Effect of Heat Source Location on Weld Formation in Laser-Arc Hybrid Welding, Gao Ming et al., "China Laser", Supplement, pp. 279-283, Apr. 2007 (English abstract) (cited article in an office action dated Dec. 14, 2018 for the Chinese application No. 2015800240031).
Extended European Search Report dated Oct. 15, 2014, for European Patent Application No. 14167675.9, 4 pages.
H. Hügel et al.: "Neue Hochleistungslaser—Entwicklungstendenzen und fertigungstechnische Einsatzpotenziale", FTK 2000. Fertigungstechnisches Kompendium, 2000, Heidelberg, pp. 63-95, XP055663608, ISBN: 978-3-540-67984-4.
Handbook of Designation and Trade name of Worldwide Irons and Steels, "Steel Welding Materials", compiled by Writing Group of "Handbook of Designation and Trade name of Worldwide Irons and Steels", 1st Edition printed Oct. 2010, China Machine Press, pp. 280-283 (with English translation).
International Search Report /Written Opinion mailed on Jun. 16, 2015, for PCT Application No. PCT/EP2015/060178, 8 pages.
J. Pfeiffer, Direkter Metallauftrag Durch Laser—Auftragschweissen Mit Draht. Konstruktionspraxis, Dec. 15, 2014, XP055663574, Retrieved from the Internet <URL:https://www.konstruktionspraxis.vogel.de/direkter-metallauftrag-durch-laser-auftragschweissen-mit-draht-a-470054>.
M. Kern: "3 Schmelzbadströmung und Prozeßstabilität", Gas—Und Magnetofluiddynamische Massnahmen Zur Beeinflussung Der Nahtqualität Beim Laserstrahlschweissen, 1999, Stuttgart, pp. 38-50, XP055663511.
M. R. Kronthaler et al. Bifocal Hybrid Laser Welding—More than a Superposition of two Processes. Institute for Machine Tools and Industrial Management. Technische Universitaet Muenchen. Physics Procedia 12 (2011) 208-214. Abgerufen und abrufbar unter: https://www.sciencedirect.com/science/article/pii/S1875389211001064.
M. Weigl, "Fertigungstechnik—Erlangen", Apr. 7, 2014, ISBN: 978-3-87525-370-2, "Complete book".
T. Fuhrich: "Marangoni-Effekt beim Laserstrahltiefschweißen von Stahl", Laser In Der Materialbearbeitung. Forschungsberichte Des IFSW, 2005, München.
The Effect of Laser and Arc Position on Weld Formation in Laser-MIG Hybrid Welding, Gao Zhiguo, Huang Jian, "Journal of Welding", No. 12, pp. 69-73, Dec. 2008 (cited article in an office action dated Dec. 14, 2018 for the Chinese application No. 2015800240031).
The Eleventh National Welding Conference Papers Collection, Welding Society of China Mechanical Engineering Society, pp. 603-606, Heilongjiang Geological Surveying and Mapping Printing Center Printing Factory, May 2005 (cited article in an office action dated Dec. 14, 2018 for the Chinese application No. 2015800240031).
Wang, Lingyun, et al., "Practical Metal Plastic Forming Physical Metallurty", Scientific and Technical Documents Publishing House, Chongqing Brach, Dec. 1990, pp. 160-162 (with English translation).
Z. Sun, A. S. Salminen. Current Status of Laser Welding with Wire Feed. Materials and Manufacturing Processes vol. 12, No. 5, 759-777, 1997.

* cited by examiner

METHODS FOR JOINING TWO BLANKS AND BLANKS AND PRODUCTS OBTAINED

CROSS-REFERENCE

This application is a continuation of U.S. application Ser. No. 16/748,235 filed Jan. 21, 2020, which is a continuation of U.S. application Ser. No. 15/954,329 filed Apr. 16, 2018 (abandoned) which is a continuation of International Application No. PCT/EP2016/081493 filed on Dec. 16, 2016, which claims priority to European Application No. 15382641.7 filed on Dec. 18, 2015, all of which are incorporated verbatim herein by reference in their entirety, including the specifications, drawings, and the claims.

The present disclosure relates to methods for joining two blanks, and methods for obtaining products after joining two blanks. The present disclosure further relates to products obtained by or obtainable by any of these methods.

BACKGROUND

The development of new materials and processes for the production of metal pieces with the aim of reducing component weight at a low cost is of utmost importance in the automotive industry. In order to achieve these objectives, the industry has developed ultra-high-strength steels (UHSS) which exhibit an optimized maximal strength per weight unit and advantageous formability properties. These steels are designed to attain a microstructure after heat treatment, which confers good mechanical properties and makes them especially suited for the hot stamping process used to form steel blanks into particular automobile parts. Since during the hot stamping process the blank is subjected to aggressive atmospheres, the steel is usually coated to avoid corrosion and oxidation.

In an attempt to minimize the weight of components while respecting structural requirements, so-called "tailored blank" techniques may be used. In these techniques, components may be made of a composite metal blank which is obtained by welding several blanks with optionally different thicknesses, different materials, size and properties. At least theoretically, using this kind of technique the use of material may be optimized. Blanks of different thickness may be joined or a steel blank may be joined with a blank of a different material for example, using the specific properties of each material where they are needed.

These blanks may be welded "edge to edge" ("butt-joining"). These so-called tailored blanks are designed to be hot stamped and afterwards be assembled to form automotive parts. Tailored welded blanks may be used for structural components such as doors, B-Pillars, beams, floor, bumpers, etc.

Similarly, "patchwork" blanks are known, in which several blanks are not necessarily welded "edge-to-edge", but instead partial or complete overlaps of blanks may be used.

An example of steel used in the automotive industry is 22MnB5 steel. The composition of 22MnB5 is summarized below in weight percentages (rest is iron (Fe) and impurities):

| C | Si | Mn | P | S | Cr | Ti | B | N |
|---|---|---|---|---|---|---|---|---|
| 0.20-0.25 | 0.15-0.35 | 1.10-1.35 | <0.025 | <0.008 | 0.15-0.30 | 0.02-0.05 | 0.002-0.004 | <0.009 |

Several 22MnB5 steels are commercially available having a similar chemical composition. However, the exact amount of each of the components of a 22MnB5 steel may vary slightly from one manufacturer to another. Usibor® 1500P is one example of a commercially available 22MnB5 steel manufactured by Arcelor. The composition of Usibor® is summarized below in weight percentages (rest is iron (Fe) and impurities):

| C | Si | Mn | P | S | Cr | Ti | B | N |
|---|---|---|---|---|---|---|---|---|
| 0.24 | 0.27 | 1.14 | 0.015 | 0.001 | 0.17 | 0.036 | 0.003 | 0.004 |

In other examples, the 22MnB5 may contain approximately 0.23% C, 0.22% Si, and 0.16% Cr. The material may further comprise Mn, Al, Ti, B, N, Ni in different proportions.

Various other steel compositions of UHSS may also be used in the automotive industry. Particularly, the steel compositions described in EP 2 735 620 A1 may be considered suitable. Specific reference may be had to table 1 and paragraphs 0016-0021 of EP 2 735 620, and to the considerations of paragraphs 0067-0079. In some examples the UHSS may contain approximately 0.22% C, 1.2% Si, and 2.2% Mn.

Steel of any of these compositions (both 22MnB5 steel such as e.g. Usibor® and the other compositions mentioned or referred to before) may be supplied with a coating in order to prevent corrosion and oxidation damage. This coating may be e.g. an aluminum-silicon (AlSi) coating or a coating mainly comprising zinc or a zinc alloy.

Patchwork blanks and tailored blanks may also be used or useful in other industries.

Usibor® 1500P is supplied in a ferritic-perlitic condition. The mechanical properties are related to this structure. After heating, hot stamping, and subsequent rapid cooling (quenching), a martensitic microstructure is obtained. As a result, maximal strength and yield strength increase noticeably.

As mentioned before, Usibor® 1500P may be supplied with an aluminum-silicon (AlSi) coating in order to prevent corrosion and oxidation damage. However, this coating has a significant effect related to its weld behavior. If Usibor® 1500P blanks are welded without any further measures, aluminum of the coating may enter into the weld area and this can cause an important reduction of the mechanical properties of the resulting component and increase the possibility of fracture in the weld zone.

In order to overcome this problem a method was proposed in DE202007018832 U1 which consists in removing (e.g. by laser ablation) a part of the coating in an area close to the welding gap. This method has the disadvantage that an additional step is needed for the production of the (tailored) blanks and components and that in spite of the repetitive nature of the process this additional step requires a complex quality process with an elevated number of parts which are to be scrapped. This entails an increase of the cost of the welding step and limits the competitiveness of the technology in the industry.

US20080011720 proposes a process for laser welding at least one metal workpiece by a laser beam, said workpiece having a surface containing aluminum, characterized in that the laser beam is combined with at least one electric arc so as to melt the metal and weld said workpiece(s). The laser in front of the arc allows the use of a flux-cored wire or the like containing elements inducing the gamma-phase (Mn, Ni, Cu, etc) favourable to maintaining an austenitic structure throughout the melted zone.

However, problems related to the only partial dilution of the filler materials along the depth of the welding zone have been found which result in a reduced welding strength. Furthermore, the filler material may not distribute homogeneously in the welding zone. This may cause material accumulation ("bumps") in certain areas thus affecting locally the behaviour of the welding zone. That is, the mechanical properties of the welding zone may vary. Another problem may be that the filler material may need to be preheated before applied because the electric arc may not be capable of melting it otherwise.

Herein a blank may be regarded as an article which has yet to undergo one or more processing steps (e.g. deformation, machining, surface treatment or other). These articles may be substantially flat plates or have more complicated shapes.

In examples of the welding methods described herein the aforementioned disadvantages are avoided or at least partially reduced.

SUMMARY

In a first aspect, the invention provides a method for joining a first blank and a second blank, at least one of the first and second blanks comprising at least a layer of aluminum, of an aluminum alloy, of zinc or of a zinc alloy. The method comprises selecting a first portion of the first blank to be joined to the second blank, and selecting a second portion of the second blank to be joined to the first portion, melting the first portion to the second portion, while supplying a filler wire to a weld zone using a first and a second laser beams. The first laser beam melts the filler wire in the weld zone during welding, and the first portion and the second portion of the blanks are melted and mixed with the melted filler wire using the second laser beam.

By using two laser beams, each one for a different purpose, it is possible to adjust the characteristics of the beams to their intended use. Such characteristics may be the power of the laser beam or the dimension of the spots. For example, the filler wire may require a different power to melt than the portions of the blanks. Another example may be the width of the weld zone compared with the size of the filler wire; each one may require a different spot size.

Without being bound to any theory, it is believed that with the two laser beams it is possible to generate or improve a Marangoni effect in the welding zone (in the melted pot).

The Marangoni effect (also called the Gibbs-Marangoni effect) is the mass transfer along an interface between two fluids due to surface tension gradient. In the present case, the Marangoni effect is a fluid flow created in the "weld pool" due to a temperature distribution in the weld pool. The surface tension is dependent on temperature and therefore, these temperature differences create a surface tension gradient on the surface of the weld pool. That is, the melted part of the substrate and the melted part of the filler material that are closer to the surface—and are therefore hotter—will be drawn from the region of lower surface tension (higher temperature) to the region of higher surface tension (lower temperature). As a result, a fluid flow (fluid being the melted part of the substrate and the melted part of the filler—reinforcement—material) is created in such a way that the height distribution and the penetration of the filler material in the welding zone is increased. The fluid flow may resemble a spiraling downward movement from the upper hotter layers of the welding zone towards its lower cooler layers.

In some examples, using the second laser beam may comprise displacing the second laser beam in an oscillating manner to mix the first portion and the second portion of the blanks with the melted filler wire. The oscillating movement of the laser beam may cause the materials in the weld pool to mix more homogeneously as a result (or in part as a result) of the Marangoni effect. Such an oscillating movement may comprise different beam motions such as a spiraling or circular movement around a central point, a wobbling movement or a weaving (zig-zag) movement along the weld direction, or a combination thereof.

In some examples, using the second laser beam may comprise generating a twin-spot to melt the first portion and the second portion and to mix the first portion and the second portion of the blanks with the melted filler wire. Two sub-beams may be generated with twin-spot laser optics, each sub-beam generating one of the two spots of the twin-spot. The use of a twin-spot may also mix the materials in the weld pool more homogeneously, again (partially) as a result of the Marangoni effect.

In some examples, the first laser beam used for melting the filler wire may have a spot having a size corresponding (e.g. equal or greater) to the filler wire diameter. Therefore, it may accurately and precisely concentrate all its energy for the purpose of melting the filler wire. The second laser beam used for melting the first portion to the second portion and for mixing the melted filler wire may generate a spot or a twin-spot having a size corresponding to a size of the weld zone. More specifically, in case of a single spot, a size (e.g. width) of the weld zone may be equal or greater than the size of the spot. In case of a twin-spot, a size (e.g. width) of the weld zone may be equal or greater to the aggregate size of the two spots of the twin-spot. The size of the weld zone may be a size of the desired welding. It may correspond to known tolerances of the blanks so that any gaps between the blanks to be appropriately filled during the welding.

In some examples, the two laser beams may be generated by a single laser head. This may facilitate alignment and improve the speed of the welding.

In some other examples, the first laser beam may be generated by a first laser head and the second laser beam may be generated by a second laser head. This may allow for easier individual control of the beam characteristics (e.g. shape, power) of the two beams.

In some examples the two laser beams may generate spots arranged substantially in line with a welding direction. The spot or spots generated by the second laser beam may precede or follow the spot of the first laser beam. Therefore, the first laser beam may generate one spot and the second laser beam may generate one or more spots, and the spots of the first and the second laser beam may be arranged substantially in line with a welding direction.

In some examples, when the second laser beam is used to generate a twin-spot, the spot of the first laser beam may be arranged before, after or between the spots of the twin-spot generated from the second laser beam. Furthermore, the two spots of the twin-spot may be arranged perpendicularly to the welding direction. Alternatively, the two spots of the twin-spot may be arranged collinearly to the welding direction.

In some examples, when the spots are arranged perpendicular to the welding direction, the two spots of twin-spot of the second laser beam may precede or follow the spot of the first laser beam. Alternatively, the spot of the first laser beam may be arranged collinearly between the spots of the twin-spots.

In some other examples, when the spots are arranged collinearly to the welding direction, the two spots of the twin-spot of the second laser beam may precede or follow the spot of the first laser beam. Alternatively, the spot of the first laser beam may be arranged collinearly between the spots of the twin-spots.

The choice of spot arrangement may depend on the characteristics of the coating, the filler material, the desired welding or of a combination thereof.

In some examples, the first and second blanks might be butt-jointed, the first portion might be an edge of the first blank and the second portion might be the edge of the second blank. Specifically, a square butt-joint (without machining or beveling of the edges) may be used. More specifically, a closed square butt weld may be used.

In some examples, the first and/or the second blank comprises a steel substrate with a coating comprising the layer of aluminum or of an aluminum alloy or the layer of zinc or of a zinc alloy. In some examples such steel substrate of the first and/or the second blank might be an ultra-high strength steel, in particular a 22MnB5 steel.

In another aspect, a method for forming a product is disclosed. The method comprises forming a blank including a method of joining a first and a second blank according to any of the methods described herein, heating the blank, and hot deforming and subsequent quenching of the heated blank.

In yet another aspect, a blank as obtainable by any of the methods proposed herein is disclosed.

In yet another aspect, a product as obtained by a method for forming a product as proposed herein is disclosed.

Different lasers may be used for laser welding such as Nd-YAG (Neodymium-doped yttrium aluminum garnet) and a $CO_2$ laser with sufficient power. Nd-YAG lasers are commercially available, and constitute a proven technology. This type of laser may also have sufficient power to melt the portions (together with the arc) of the blanks and allows varying the width of the focal point of the laser and thus of the weld zone. Reducing the size of the "spot" increases the energy density.

Different filler wires may be used, according to any requirements of the welding zone, as the power of the filler wire melting laser may be adjusted to the requirements of the filler wire (e.g. melting temperature). The filler wire used may comprise gammagenic elements to stabilize the austenitic phase. Austenitic stabilizing elements counteract the ferrite stabilizing effect of Al or Zn, thus minimizing (or avoiding) ferrite in the final weld joint. According to this aspect, aluminum (or zinc) may be present in the weld zone, but it does not lead to worse mechanical properties after hot deformation processes such as hot stamping when the filler wire comprises gammagenic elements, which stabilizes the austenitic phase. These gammagenic elements are introduced in the weld zone and mixed with the melt, and as a consequence austenite (gamma phase iron, γ-Fe) may be obtained by heating. During rapid cooling (quenching) after a hot deformation, a martensitic microstructure which gives satisfactory mechanical characteristics may thus be obtained There is thus no need to remove an aluminum, aluminum alloy, zinc or zinc alloy layer, such as was proposed in some prior art methods. When e.g. coated steel blanks are to be welded, this may be done quicker and cheaper since an intermediate process step is not necessary anymore.

Gammagenic elements are herein to be understood as chemical elements promoting the gamma-phase, i.e. the austenite phase. The gammagenic elements (or "austenitic stabilizer elements") may be selected from a group comprising Nickel (Ni), Carbon (C), Manganese (Mn), Copper (Cu) and Nitrogen (N). Although the addition of "ferrite stabilizer elements" may counteract the action of "austenitic stabilizer elements", optionally these "ferrite stabilizer elements" can still be suitable components when other factors are also taken into account for the composition of the filler. For example, for promoting hardness Molybdenum (Mo) could be a suitable element and e.g. for corrosion resistance Silicon (Si) and Chromium (Cr) could be suitable components.

Aluminum alloys are herein to be understood as metal alloys in which aluminum is the predominant element. Zinc alloys are herein to be understood as metal alloys in which zinc is the predominant element.

Preferably, the amount of gammagenic elements in the filler wire is sufficient to compensate for the presence of alphagenic elements such as Cr, Mo, Si, Al and Ti (Titanium). Alphagenic elements promote the formation of alpha-iron (ferrite). This may lead to reduced mechanical properties as the microstructure resulting after hot stamping and quenching may comprise martensite-bainite and ferrite.

In some examples, the filler may contain a austenite stabilizing elements and may have a composition in weight percentages of 0%-0.3% of carbon, 0%-1.3% of silicon, 0.5%-7% of manganese, 5%-22% of chromium, 6%-20% of nickel, 0%-0.4% of molybdenum, 0%-0.7% of Niobium, and the rest iron and unavoidable impurities.

In other examples, the metal filler material may be stainless steel AlSi 316L, as commercially available from e.g. Hoganäs®. The metal filler may have the following composition in weight percentages: 0%-0.03% carbon, 2.0-3.0% of molybdenum, 10%-14% of nickel, 1.0-2.0% of manganese, 16-18% chromium, 0.0-1.0% of silicon, and the rest iron and unavoidable impurities.

Alternatively 431L HC, as commercially available from e.g. Hoganäs® may be used. This metal filler has the following composition in weight percentages: 70-80% of iron, 10-20% of chromium, 1.0-9.99% of nickel, 1-10% of silicon, 1-10% of manganese and the rest impurities.

Further examples may use 3533-10, as further commercially available from e.g. Hoganäs®. The filler has the following composition in weight percentages: 2.1% carbon, 1.2% of silicon, 28% of chromium, 11.5% of nickel, 5.5% of molybdenum, 1% of manganese and the rest iron and impurities.

It was found that the presence of nickel in these compositions led to good corrosion resistance and promoted the austenite formation. The addition of chromium and silicon aids in corrosion resistance, and molybdenum aids in increasing the hardness. In alternative examples other stainless steels may also be used, even UHSS. In some examples, the filler may incorporate any component providing higher or lower mechanical characteristics depending on circumstances.

Additionally, it has been found that a filler of these mixtures leads to very satisfactory mechanical properties of the final work product, i.e. after hot stamping and quenching. Also, other fillers can be used.

In a second aspect, the present disclosure provides a method for forming a product comprising forming a blank including a method of joining a first and a second blank in accordance with any of the herein described welding methods and subsequently heating the blank, and hot deforming of the heated blank and final quenching. Heating may include heat treatment in a furnace prior to deformation. Hot deforming may include e.g. hot stamping or deep drawing.

BRIEF DESCRIPTION OF THE DRAWINGS

Non-limiting examples of the present disclosure will be described in the following, with reference to the appended drawings, in which.

DETAILED DESCRIPTION OF EXAMPLES

FIGS. 1*a*-1*d* schematically illustrate examples of methods of joining blanks.

Figure 1A:
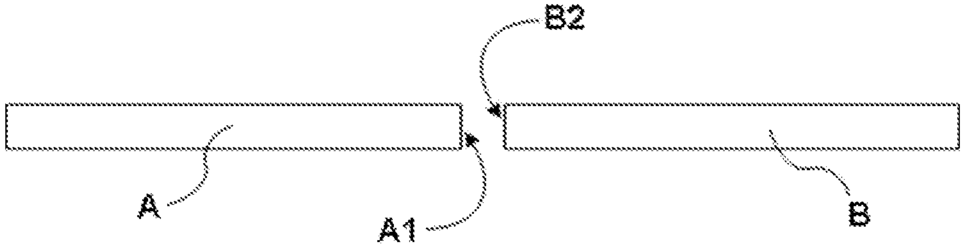
FIGS. 1*a*-1*d* schematically illustrate examples of joining two blanks.

In FIG. 1*a* a first portion or region A1 of a first blank A is to be joined to a second portion or region B2 of a second blank B. In this example, the two blanks are to be butt-joined, i.e. an edge-to-edge welding, specifically with straight edges (without special shaping/beveling of the edges).

In this example, both blanks A and B may be of coated steel, such as e.g. Usibor® 1500P. Both blanks may comprise a steel substrate 1 upon which a coating 2 may be provided. The coating applied in this example is aluminum-silicon (Al87Si10Fe3). Due to the process of application of the coating, the resulting coating may have a metal alloy layer 4 and an intermetallic layer 3 as illustrated in FIG. 1*b*-1*d*.

Figure 1B:
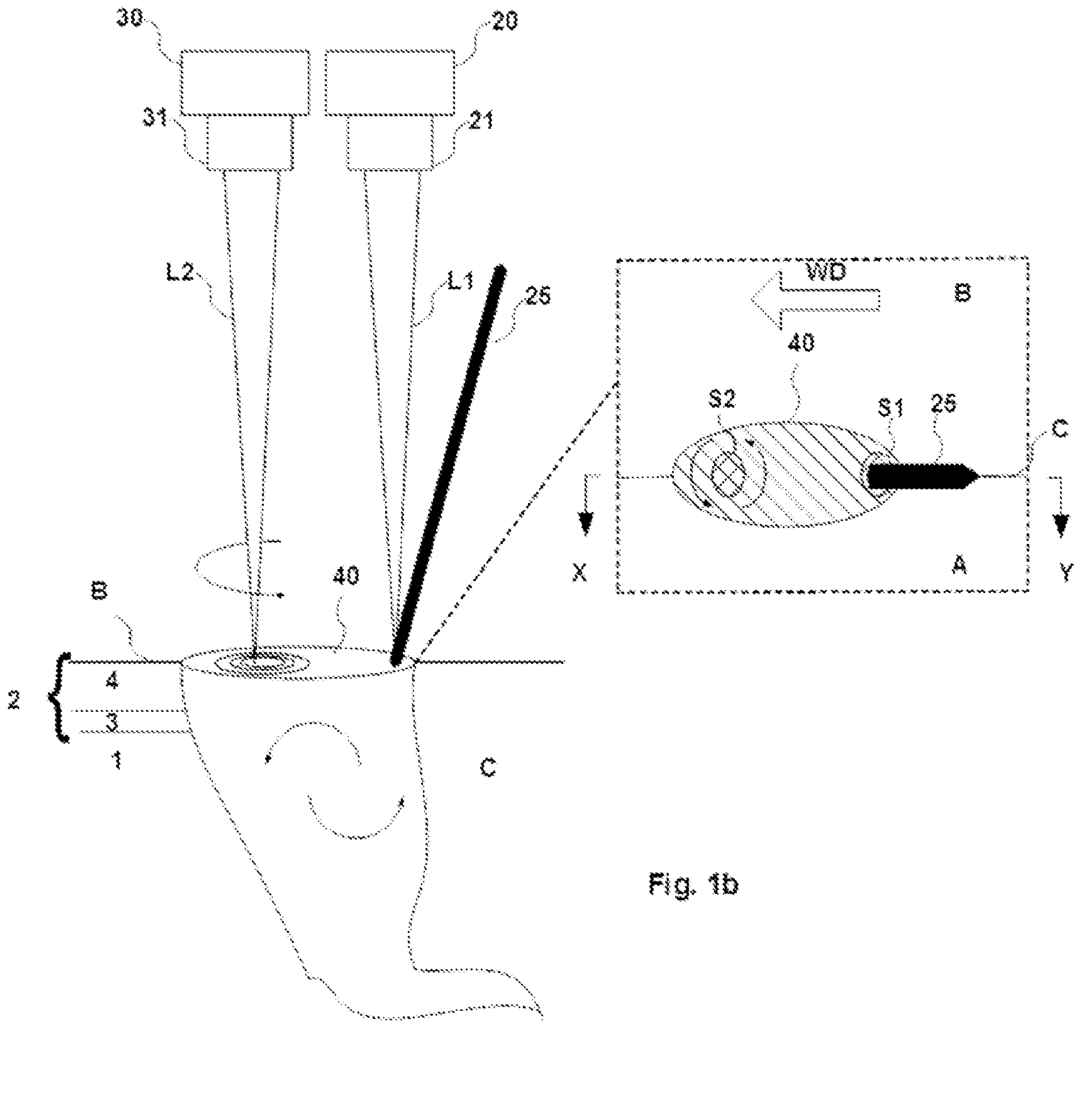
Figure 1C:
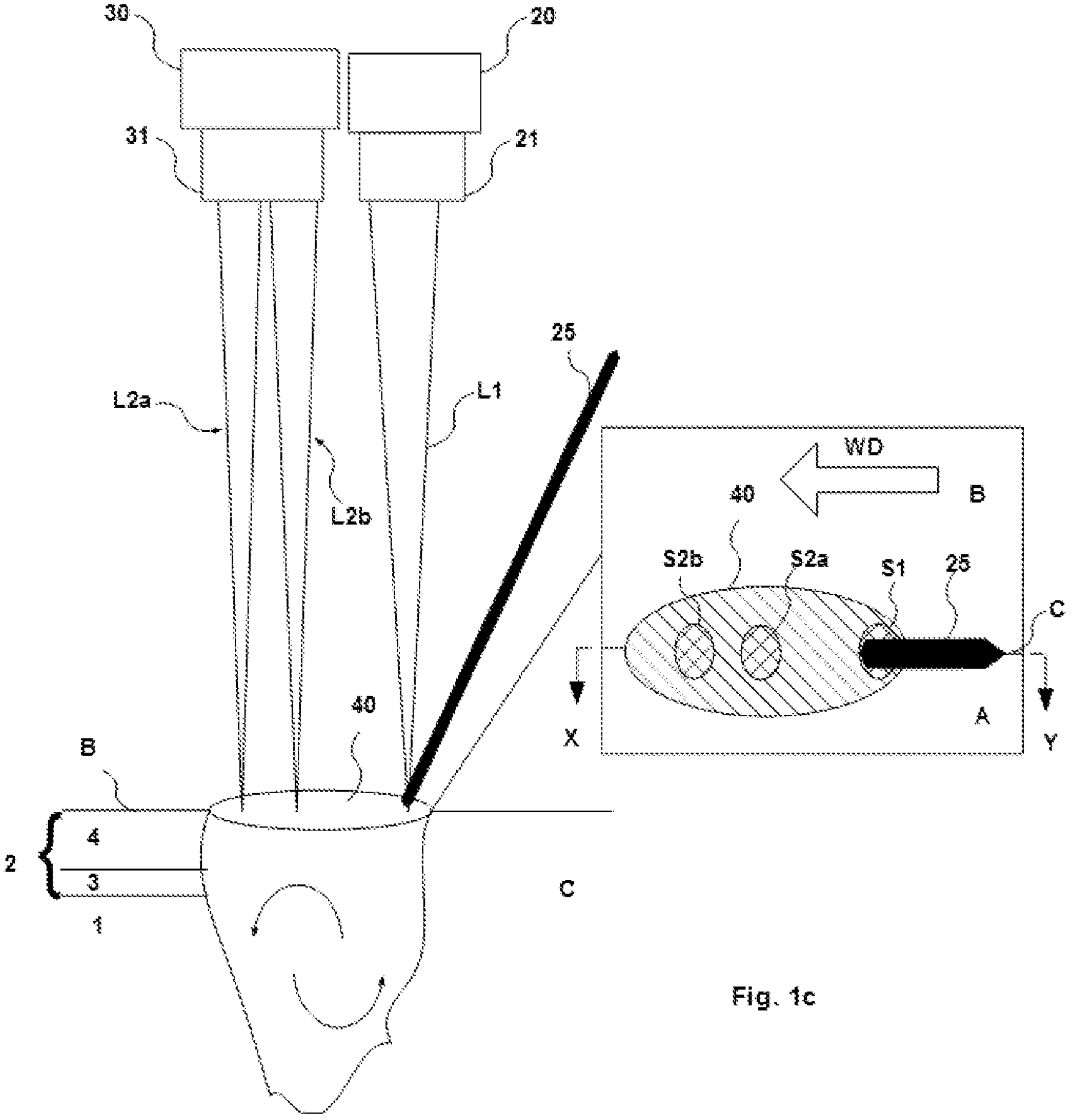
Figure 1D:
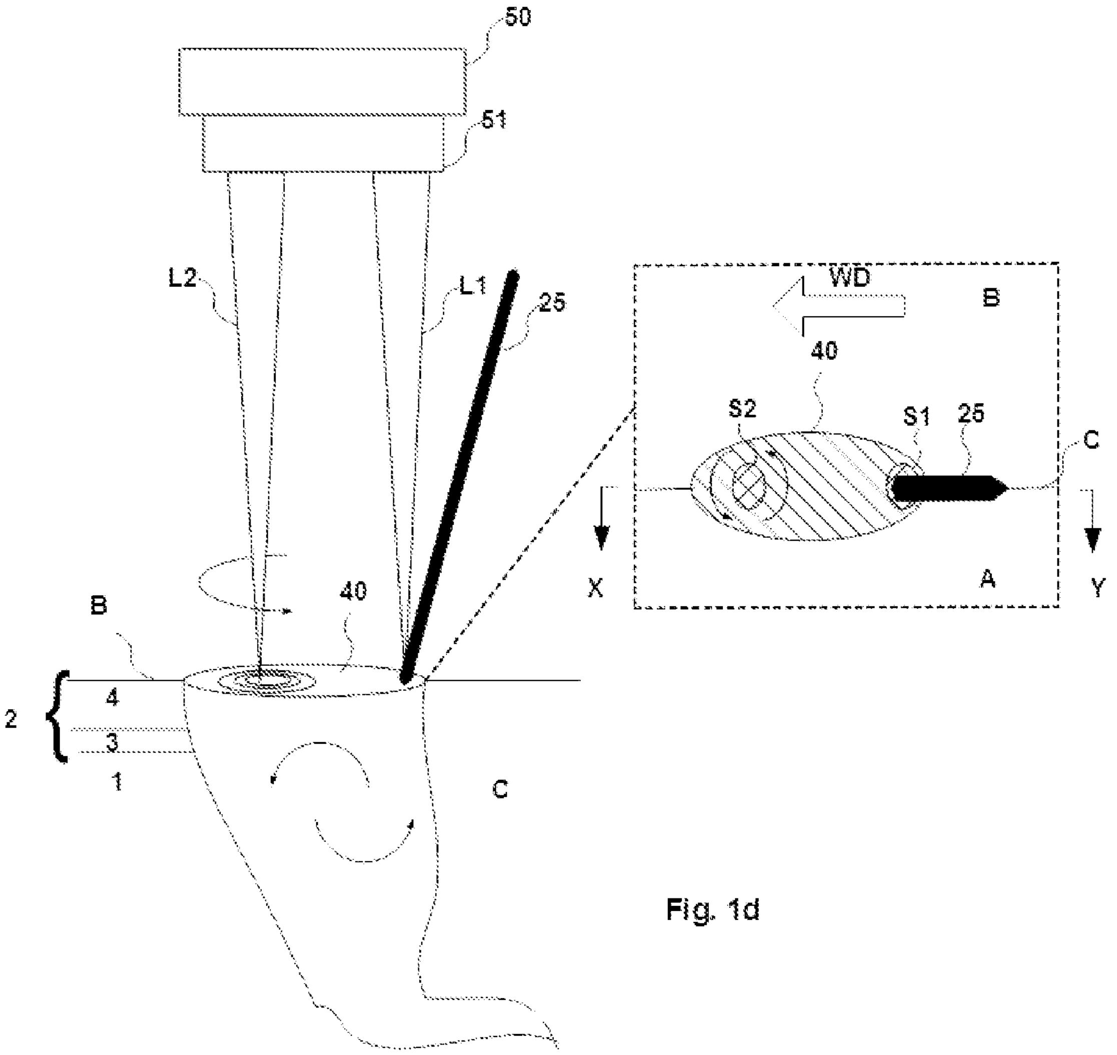

FIGS. 1*b*-1*d* schematically illustrate a cross-sectional view along the plane defined by the line x-y and the corresponding top view according to some examples of dual laser welding. Such plane defined by the line x-y corresponds to the welding beam C, i.e. the line where the edge of blank A contacts the edge of blank B. In these examples, blanks A and B may comprise a steel substrate 1 with a coating 2, which may have a metal alloy layer 4 as the outermost layer and an intermetallic layer 3 arranged between the steel substrate 1 and the metal alloy layer 4. When blanks A and B are welded, the coating layer and the steel substrate of the welded portions of blanks A and B, and the filler are mixed in the welding beam. Thus, after welding, the welding beam does not comprise a defined coating layer. In these examples, the arrow WD indicates the welding direction in the top view.

FIG. 1*b* further illustrates a cross-sectional view along the plane defined by the line x-y and the corresponding top view of the method of joining according to an example of dual laser welding. Schematically illustrated is a cross-sectional and top view of a filler metal melting laser 20 having a laser head 21 from which a first laser beam L1 exits. A filler wire 25 may be used as welding material. Also schematically illustrated is a laser welder 30 having a laser head 31 from which a second laser beam L2 exits.

In a dual laser welding process, two laser beams collaborate to form a weld zone 40. In this example, the first laser beam L1 (directly) melts the filler wire. The second laser beam L2 melts portions of the blanks in a weld pool substantially where the two blanks are to be welded. The melted filler wire is directed in the—common—weld pool and at the same time the melted filler wire mixes with the melted portions of the blanks. As the filler wire melts, any gap between the blanks may be filled and a weld may be created.

FIG. 1*b* further illustrates a top view of the weld zone 40 created in the zones to be welded of the blanks A and B. Laser beam spot S1 corresponds to the spot created by the first laser beam L1, while laser beam spot S2 corresponds to the spot created by the second laser beam L2.

In the example of FIG. 1*b*, the second laser beam L2, the laser welder beam, may be moveable in a wobbling manner to mix the material in the weld pool as a consequence of the Marangoni effect. As the melted portion of the blanks comprises steel substrate material as well as coating material, mixing the weld pool ingredients may avoid any harmful effects attributable to the Al alloy coating and, therefore, mechanical properties of the welded zone may not be affected.

It may be seen that in this case, there is no need for removing the coating of the steel substrates prior to welding, as the homogeneous mixing of the materials along the whole thickness of the blanks mitigates any harmful effects of the coating thus simplifying and speeding up manufacture. This may bring about a substantial cost reduction. At the same time, a filler wire of suitable composition may ensure that good mechanical properties are obtained after the standard heat treatment for Usibor® and after hot deformation processes such as hot stamping.

A standard treatment for Usibor® blanks would be to heat the obtained blank in e.g. a furnace to bring about (among others) austenization of the base steel. Then the blank may be hot stamped to form e.g. a bumper beam or a pillar. During rapid cooling after a hot deformation, martensite which gives satisfactory mechanical characteristics may thus be obtained. The standard treatment is not affected in any manner by the methods of joining proposed herein. In particular, thanks to the elements of a suitable filler wire (i.e. filler wire with gammagenic elements) that are supplied into the weld zone, a martensite structure can also be obtained in the area of the weld, in spite of the presence of aluminum.

FIG. 1*c* further illustrates a cross-sectional view along the plane defined by the line x-y and the corresponding top view of a method of joining two blanks according to another example of dual laser welding. Schematically illustrated is a filler metal melting laser 20 having a laser head 21 from which a first laser beam L1 exits. A filler wire 25 may be used as welding material. Also schematically illustrated is a laser welder 30 having a laser head 31 from which two sub-beams L2*a* and L2*b* exit. The laser head 31 may comprise twin-spot laser optics.

In this example of dual laser welding process, the laser beams also collaborate to form a weld zone 40. The first laser beam L1 melts the filler wire 25 similarly as in the example discussed with reference to FIG. 1*b*. The two sub-beams, L2*a* and L2*b*, generate a twin-spot that melts portions of the blanks in a weld pool substantially where the two blanks are to be welded. The melted filler wire is directed in the—common—weld pool and at the same time the melted filler wire mixes with the melted portions of the blanks. The twin-spot may warrant the mixing of the melted filler wire material with the melted portions of the blanks without any wobbling of any of the sub-beams L2*a* and L2*b* to be required.

FIG. 1*c* further illustrates a top view of the weld zone 40 created in the zones to be welded of the blanks A and B. Laser beam spot S1 corresponds to the spot created by the first laser beam L1, while laser beam spot S2*a* and S2*b* corresponds to the spots created by the sub-beams L2*a* and L2*b* respectively.

FIG. 1*d* represents a variation of the example of FIG. 1*b*, having a single laser head 51 and a single laser melting the wire and welding. In this example the melting and welding laser 50 has a single laser head 51 from which a first laser beam L1 and a second laser beam L2 exit.

Figure 2A:
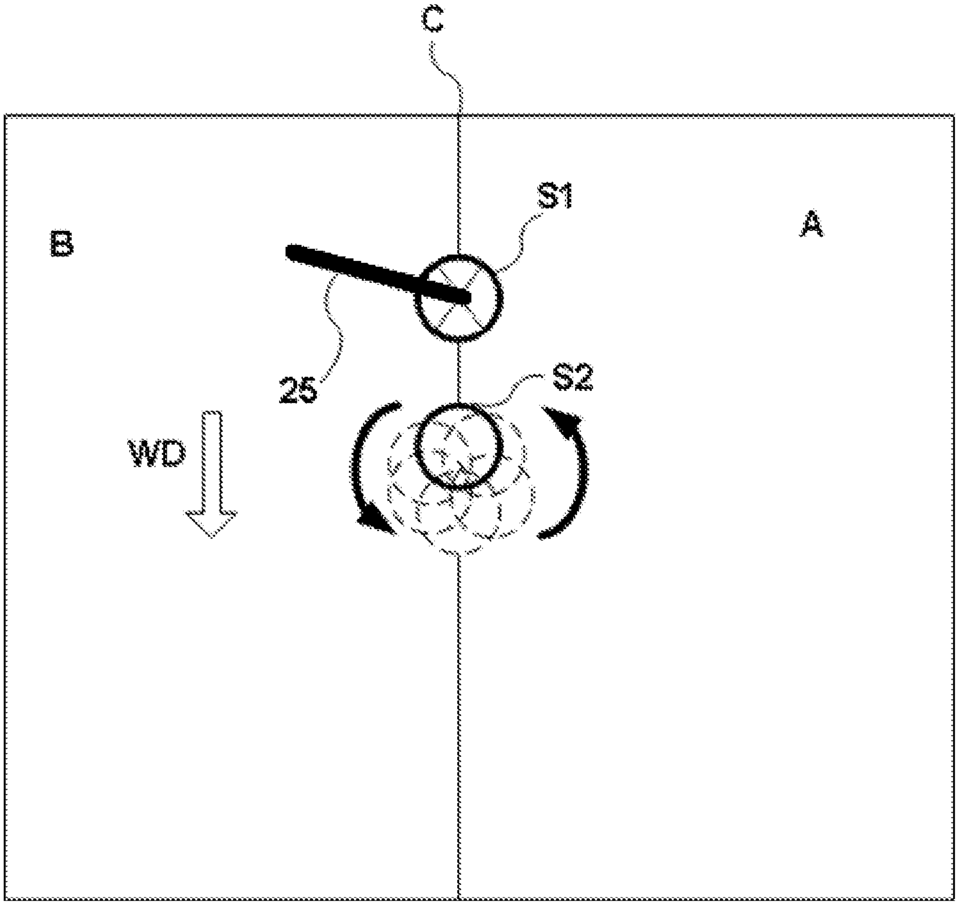
FIGS. 2*a*-2*c* schematically illustrate example arrangements for a welding laser beam and a filler wire melting beam according to various implementations.
Figure 2B:
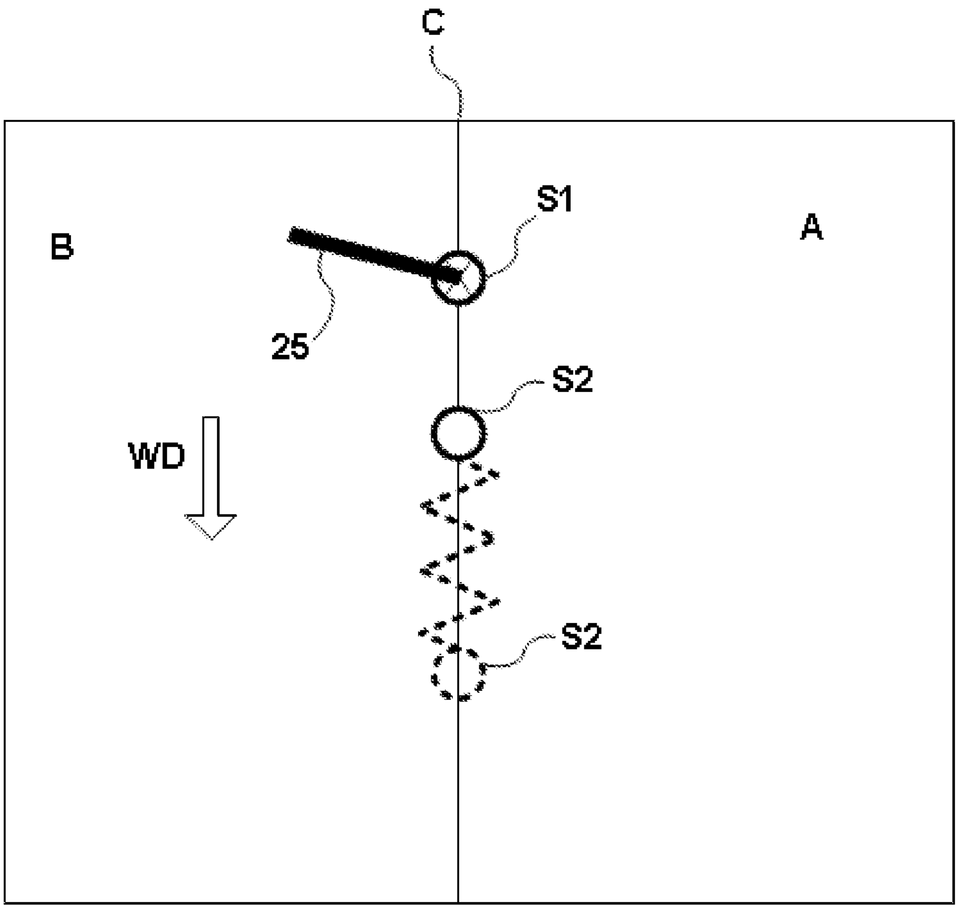
Figure 2C:
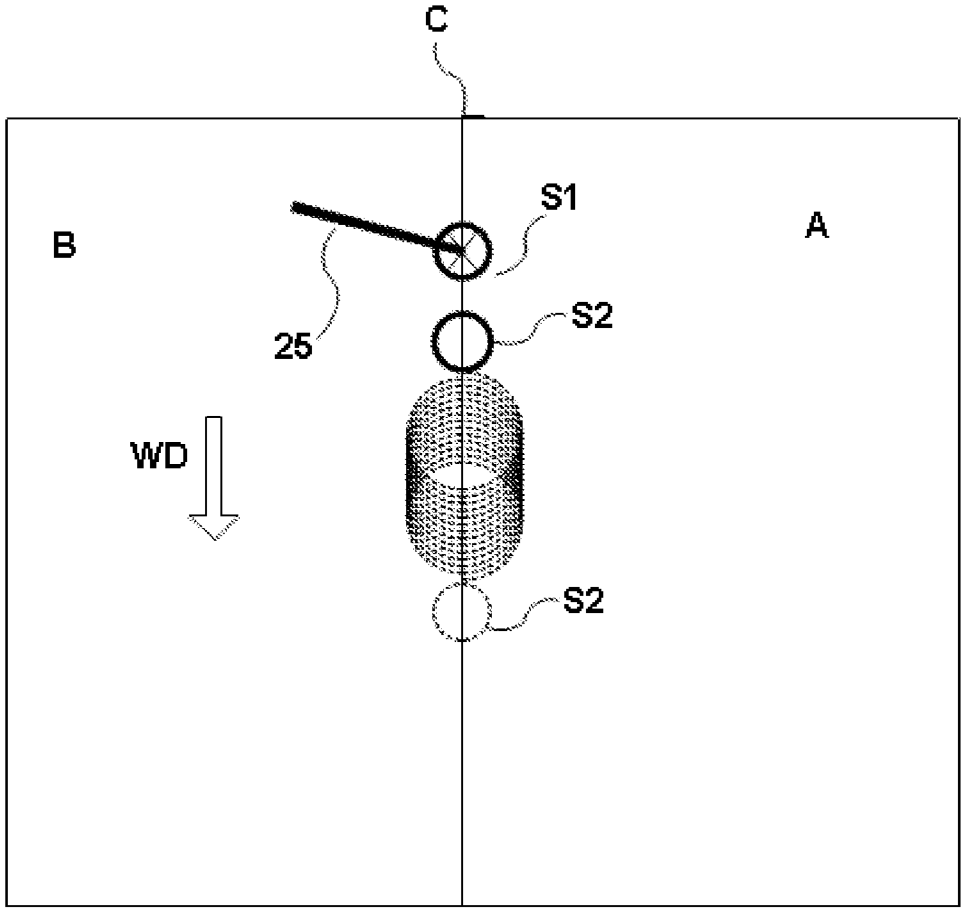

FIG. 2*a* schematically illustrates a top view of a method of joining two blanks according to an example. A first blank A is to be joined to a second blank B along a weld seam C, wherein a first laser beam spot S1 may be responsible for melting a filler wire 25 material in the weld seam C zone and a second laser beam spot S2 may be responsible for melting a portion of the first blank A and a portion of the second blank B as well as mix the melted filler wire material with the melted portions of the blanks. The perforated line circles indicate the circular movement of the second laser beam in order to homogeneously mix the melted materials. FIG. 2*b* schematically illustrates a weaving movement of the laser beam spot S2 while FIG. 2*c* schematically illustrates a wobbling movement of the laser beam spot S2. The selection of movement may depend on weld zone characteristics.

In all the examples illustrated herein so far, blanks in the shape of flat plates are joined together. It should be clear that examples of the methods herein disclosed may also be applied to blanks of different shapes.

Figure 3A:
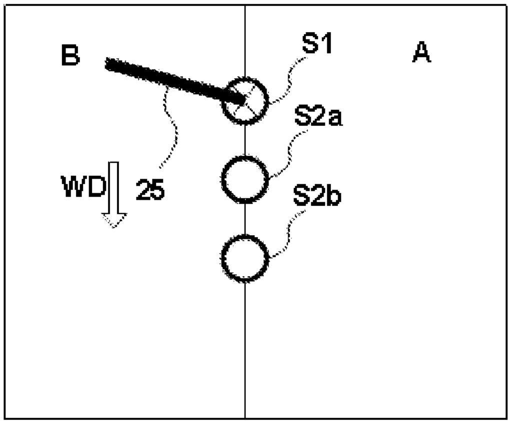
FIGS. 3*a*-3*f* schematically illustrate relative positions of welding laser beams and filler wire melting beams.
Figure 3B:
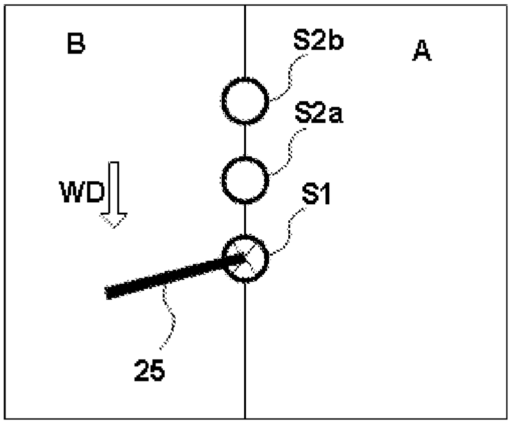
Figure 3C:
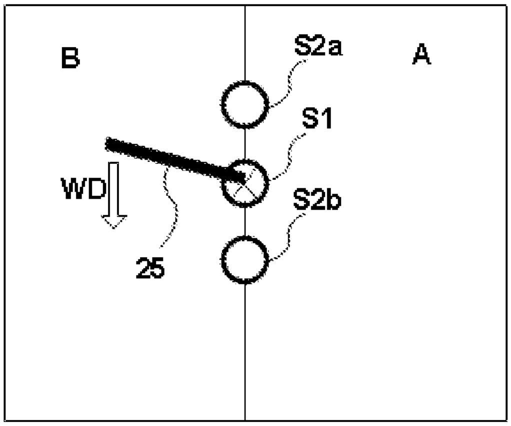
Figure 3D:
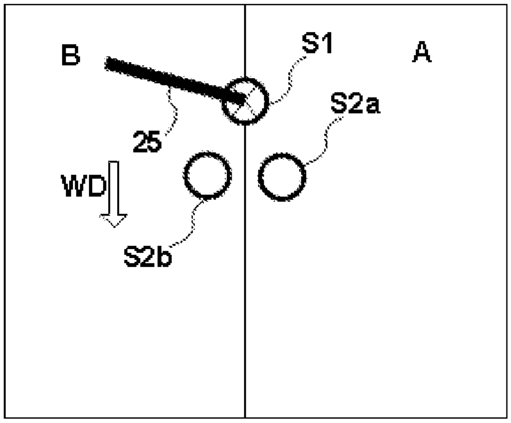
Figure 3E:
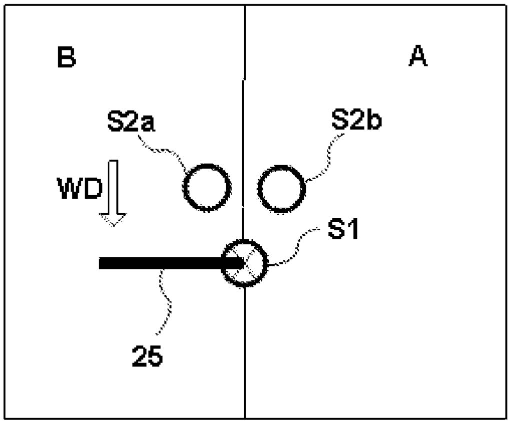
Figure 3F:
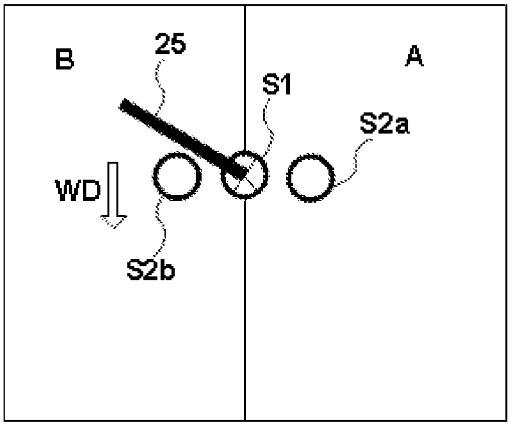

FIGS. 3*a*-3*f* schematically illustrate the relative positions of the spots generated from the first and second laser beams when a twin-spot laser beam is used for melting the portions of the blanks and for mixing the melted portions of the blanks with the melted filler wire. The arrow indicates the welding direction. In FIGS. 3*a*-3*c* the three spots are arranged collinearly along the welding direction. In FIG. 3*a* the spots S2*a* and S2*b* of the twin-spot precede the spot of the filler wire melting beam. In FIG. 3*b* the spot of the filler wire melting beam S1 precedes the spots S2*a* and S2*b* of the twin-spot. In FIG. 3*c* the spot S1 of the filler wire melting beam is interpolated between the two spots S2*a* and S2*b* of the twin-spot. In FIG. 3*d* the spots S2*a* and S2*b* of the twin-spot precede the spot S1 of the filler wire melting beam. However, in this case, the two spots of the twin-spot are arranged perpendicularly to the welding direction. In FIG. 3*e*, the two spots S2*a* and S2*b* of the twin-spot are arranged also perpendicularly to the welding direction, but, contrary to the arrangement of FIG. 3*d*, they follow the spot S1 of the filler wire melting beam. Finally, in FIG. 3*f*, the three spots are arranged along a direction perpendicular to the welding direction where the spot S1 of the filler wire melting beam is interpolated between the two spots S2*a* and S2*b* of the twin-spot.

When a twin-spot is used, the two spots may also induce or improve a similar Marangoni effect and the elements of the welding zone may again be homogeneously distributed with the austenite stabilizing elements in the filler reaching the bottom part of the weld. Therefore, the aluminum may not lead to worse mechanical properties in the welding zone after hot deformation processes such as hot stamping.

The percentage of ferrite and austenite depends on the amount of aluminum. Adding these austenite stabilizing stainless filler materials may increase the mass content of aluminum necessary for starting the ferrite phase. In other words, thanks to the filler, more aluminum may be allowed in the weld area while still maintaining the desired mechanical properties, i.e. while still ensuring the presence of austenite. Thus, the influence of the aluminum in the welding area may be minimized and a weld joint with good mechanical properties may be obtained.

Figure 4:
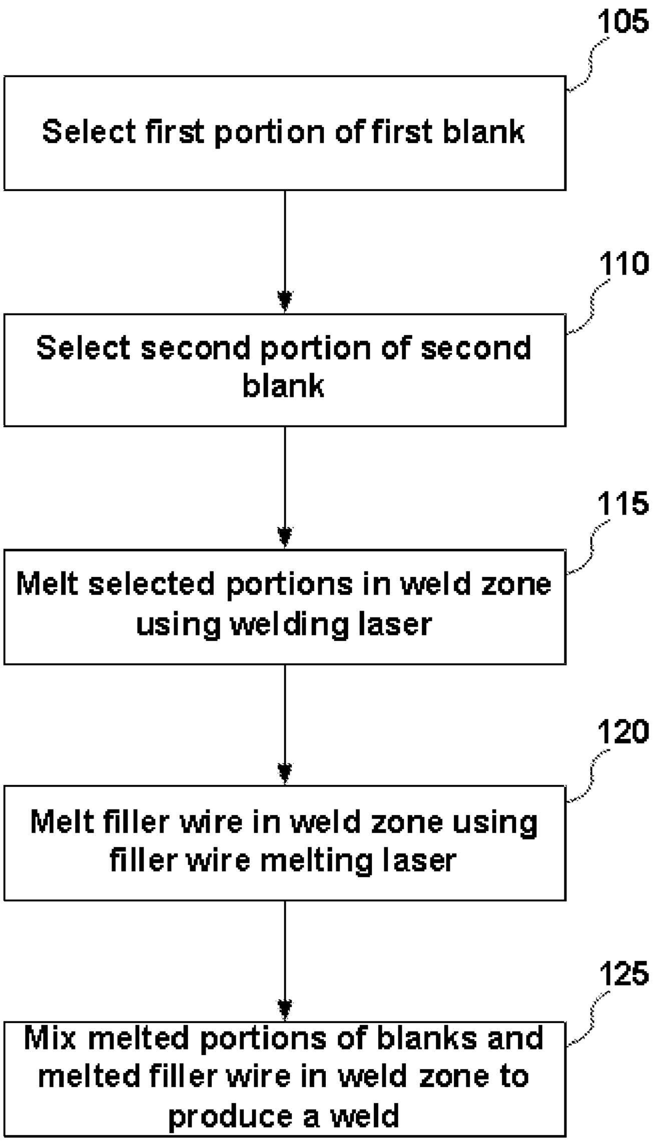
FIG. 4 is a flow diagram of a method of joining blanks.

FIG. 4 is a flow diagram of a method of joining blanks according to an example. In box 105, a first portion of a first blank to be joined to a second blank may be selected. The first blank may comprise at least a layer of aluminum or of an aluminum alloy or a layer of zinc or of a zinc alloy. In some examples, the first blank might comprise a steel substrate with a coating comprising the layer of aluminum or of an aluminum alloy or the layer of zinc or of a zinc alloy. In some examples, the steel substrate may be an ultra-high strength steel, in particular the steel may be a boron steel.

In box 110, a second portion of a second blank to be joined to the first portion may be selected. The second blank may also comprise at least a layer of aluminum or of an aluminum alloy or a layer of zinc or of a zinc alloy. In some examples, the second blank might comprise a steel substrate with a coating comprising the layer of aluminum or of an aluminum alloy or the layer of zinc or of a zinc alloy. In some examples, the steel substrate may be an ultra-high strength steel and in particular a boron steel.

In box 115, using a laser welding beam, the first portion and the second portion of the blanks may be melted in a weld zone. In box 120, a filler wire may be supplied and melted to the weld zone using a filler wire melting laser beam. The filler wire melting laser beam corresponds to a first laser beam. Such first laser beam is arranged to melt the filler wire in the weld zone. The laser welding beam may correspond to a second laser beam. Using such second laser beam may comprise displacing the second laser beam in an oscillating manner or using a twin-spot laser.

In box 125, the melted portions of the blanks and the melted filler wire are mixed in the weld zone to produce a weld. By mixing the filler along the whole weld zone, i.e. along the whole thickness of the blanks, mechanical properties of the weld can be improved.

Good mechanical properties are obtained, where two Usibor® 1500P blanks were welded by dual laser welding with the use of a filler wire melting laser beam and a welding laser beam. Particularly, a high tensile strength is obtained when fillers containing austenite stabilizing materials are used. The tensile strength obtained could be compared with an unwelded Usibor® products and a welded 22MnB5 uncoated boron products.

These good mechanical properties may be obtained using a relatively high welding speed, improving the manufacturing processes and reducing the welding time. Welding speed from 5-12 m/min may be achieved in various examples.

Although only a number of examples have been disclosed herein, other alternatives, modifications, uses and/or equivalents thereof are possible. Furthermore, all possible combinations of the described examples are also covered. Thus, the scope of the present disclosure should not be limited by particular examples, but should be determined only by a fair reading of the claims that follow.

The invention claimed is:

1. A method for joining a first blank and a second blank, the method comprising:

selecting a first portion of the first blank to be joined to the second blank, and selecting a second portion of the second blank to be joined to the first portion;

wherein the first blank, the second blank, or both the first blank and the second blank comprise a boron steel substrate with a coating of aluminum or aluminum alloy, and the first portion being an edge of the first blank and the second portion being an edge of the second blank;

melting the first portion and the second portion to create a weld pool;

supplying a melted filler wire into the weld pool, the filler wire being made of a filler material for stabilizing the austenitic phase of a weld seam made by the weld pool based on an added amount of the filler material in proportion to an amount of the aluminum or aluminum alloy in the weld pool;

homogenously mixing the melted filler material with the aluminum or aluminum alloy along the entire thickness of the first or second blanks; and heating, at a temperature, the first and second blanks to create an austenitic phase of the weld seam such that the added amount of the filler material promotes stabilization of the austenitic phase of the weld seam at the heating temperature;

wherein a first laser beam is configured to directly melt the filler wire, and not the first portion and the second portion of the blanks, into the weld pool such that the filler wire is melted exclusively by the first laser beam, and a second laser beam is directed at the first portion and the second portion of the blanks and not the filler wire for melting the first portion and the second portion of the blanks and for mixing the aluminum or aluminum alloy with the filler material such that the aluminum or aluminum alloy is homogeneously mixed with the filler material and the boron steel substrate throughout an entire thickness of the first or second blank.

2. The method according to claim 1, wherein using the second laser beam comprises displacing the second laser beam in an oscillating manner to mix the first portion and the second portion of the blanks with the melted filler wire.

3. The method according to claim 1, wherein using the second laser beam comprises using a twin-spot laser beam to melt the first portion and the second portion and to mix the first portion and the second portion of the blanks with the melted filler wire.

4. The method according to claim 1, wherein the first laser beam generates a spot having a size equal to a diameter of the filler wire.

5. The method according to claim 1, wherein the first and second laser beams are generated by a single laser head.

6. The method according to claim 1, wherein the first laser beam is generated by a first laser head and the second laser beam is generated by a second laser head.

7. The method according to claim 1, wherein the first laser beam generates one spot and the second laser beam generates one or more spots and the first and second laser beams generate spots arranged substantially in line with a welding direction.

8. The method according to claim 1, wherein using the second laser beam comprises generating a twin-spot comprising spots, and wherein the spots of the twin-spot are arranged substantially perpendicularly to a welding direction.

9. The method according to claim 8, wherein the spots of the twin-spot either precede or follow a spot of the first laser beam in the welding direction.

10. The method according to claim 1, wherein the first laser beam generates one spot and using the second laser beam comprises generating a twin-spot comprising spots, wherein the spots of the twin-spot and the spot of the first laser beam are arranged collinearly in a welding direction, and wherein the spot of the first laser beam is arranged between the spots of the twin-spot.

11. The method according to claim 1, wherein the filler material consists of iron, 0%-0.3% by weight carbon, 0%-1.3% by weight silicon, 0.5%-7% by weight manganese, 5%-22% by weight chromium, 6%-20% by weight nickel, 0%-0.4% by weight molybdenum, and 0%-0.7% by weight niobium, and optionally a negligible amount of an unavoidable impurity.

12. The method according to claim 1, wherein the filler material consists of iron, 0%-0.03% by weight carbon, 2.0-3.0% by weight molybdenum, 10%-14% by weight nickel, 1.0%-2.0% by weight manganese, 16%-18% by weight chromium, and 0%-1.0% by wight silicon, and optionally a negligible amount of an unavoidable impurity.

13. The method according to claim 1, wherein the filler material comprises at least one or a combination of nickel, chromium, or manganese.

14. A method for forming a product, the method comprising:

forming a blank according to the method of claim 1 by joining the first blank and the second blank and forming a weld seam, heating the blank, and hot deforming and subsequently quenching the heated blank.

15. The method of claim 14, wherein the product is a structural component of an automobile.

16. The method according to claim 1, wherein a tensile strength of the weld seam is equal to a tensile strength of the first or second blank.

17. The method according to claim 14, wherein a tensile strength of the weld seam is equal to a tensile strength of the first or second blank.

* * * * *